United States Patent [19]

Bazuin

[11] Patent Number: 4,576,069

[45] Date of Patent: Mar. 18, 1986

[54] TURRET LATHE HAVING PROBE AND PROTECTIVE COVER

[75] Inventor: Johannes Bazuin, Cincinnati, Ohio

[73] Assignee: LeBlond Makino Machine Tool Co., Cincinnati, Ohio

[21] Appl. No.: 576,320

[22] Filed: Feb. 2, 1984

[51] Int. Cl.$^4$ ............................................. B23B 25/06
[52] U.S. Cl. ...................................... 82/2 R; 82/2 B; 82/34 R; 82/36 A; 408/2; 408/35; 409/133
[58] Field of Search ...................... 408/2, 35; 409/133; 82/2 R, 2 B, 36 A, 34 R, 1 R

[56] References Cited

U.S. PATENT DOCUMENTS

| | | | |
|---|---|---|---|
| 3,191,294 | 6/1965 | Daugherty | 408/2 |
| 3,623,216 | 11/1971 | Aihara et al. | 408/2 |
| 4,417,816 | 11/1983 | Kindl et al. | 82/34 R |

FOREIGN PATENT DOCUMENTS

| | | | |
|---|---|---|---|
| 24814 | 2/1980 | Japan | 409/133 |
| 66602 | 4/1983 | Japan | 82/2 B |
| 2141364 | 12/1984 | United Kingdom | 82/36 A |
| 2141546 | 12/1984 | United Kingdom | 82/36 A |

Primary Examiner—Francis S. Husar
Assistant Examiner—Jerry Kearns
Attorney, Agent, or Firm—Wood, Herron & Evans

[57] ABSTRACT

A turret lathe having a part gaging probe at one position on the turret. The lathe has a probe cover supported in a holder when the probe is in use. The numerically-controlled lathe mechanism enables the turret to carry the probe over the cover to apply or remove the cover during the cycle of operations.

6 Claims, 5 Drawing Figures

TURRET LATHE HAVING PROBE AND PROTECTIVE COVER

This invention relates to a numerically-controlled turret lathe, and more particularly, to a lathe having a probe carried on its turret for measuring the dimensions of a workpiece.

The lathe to which the present invention is directed has a housing within which are contained a rotatable chuck which carries a workpiece and a turret which carries an assortment of tools which are used to remove metal from the rotating workpiece. The turret has mechanisms for rotating it to bring the proper tool into position, and it has mechanisms for moving it along various axes in a very precise manner in order to bring the selected tool into position with respect to the workpiece and to move the tool with respect to the workpiece as metal is being removed. The lathe supplies a coolant to the area of contact between the tool and the workpiece in order to remove the heat arising from the cutting of the metal. During the metal-removing process, the environment within the housing of the lathe is necessarily very dirty.

Recently, such lathes have been provided with a gaging probe, that is, a probe carried by the turret and adapted to be moved into position with respect to the workpiece to measure the dimensions of the workpiece and thus to ascertain that the part is made within the desired tolerances.

Because of the environment of spraying lubricant and flying metal chips and the like, the probe is given as much protection as possible. Nevertheless, probes do fail within too short a time because of the exposure to the coolant and the like. Some probes have lasted as little as one day. If a probe fails, not only is repair expensive, but when the probe is returned to the machine, the machine must be recalibrated, requiring expensive labor and down time for the lathe.

The objective of the invention has been to provide improved protection for the probe.

This objective is attained by providing a cover for the probe when the probe is not in use and to provide for the removal of the cover when the probe is to be used for its gaging function.

More specifically, the invention provides for the retention of the probe cover by a gripper opposite the turret and alongside the chuck. The machine is programmed to move the turret and probe into position for the probe to enter the cover. A friction grip provided by an O-ring secures the cover to the probe. The cover is normally secured within the gripper housing by a latch which is released allowing the probe cover to be retracted from the gripper housing. Within the gripper housing a proximity switch ascertains the presence of the cover; if present, gaging may proceed.

The several features and objectives of the invention will become more readily apparent from the following detailed description taken in conjunction with the accompanying drawings in which.

Figure 1:
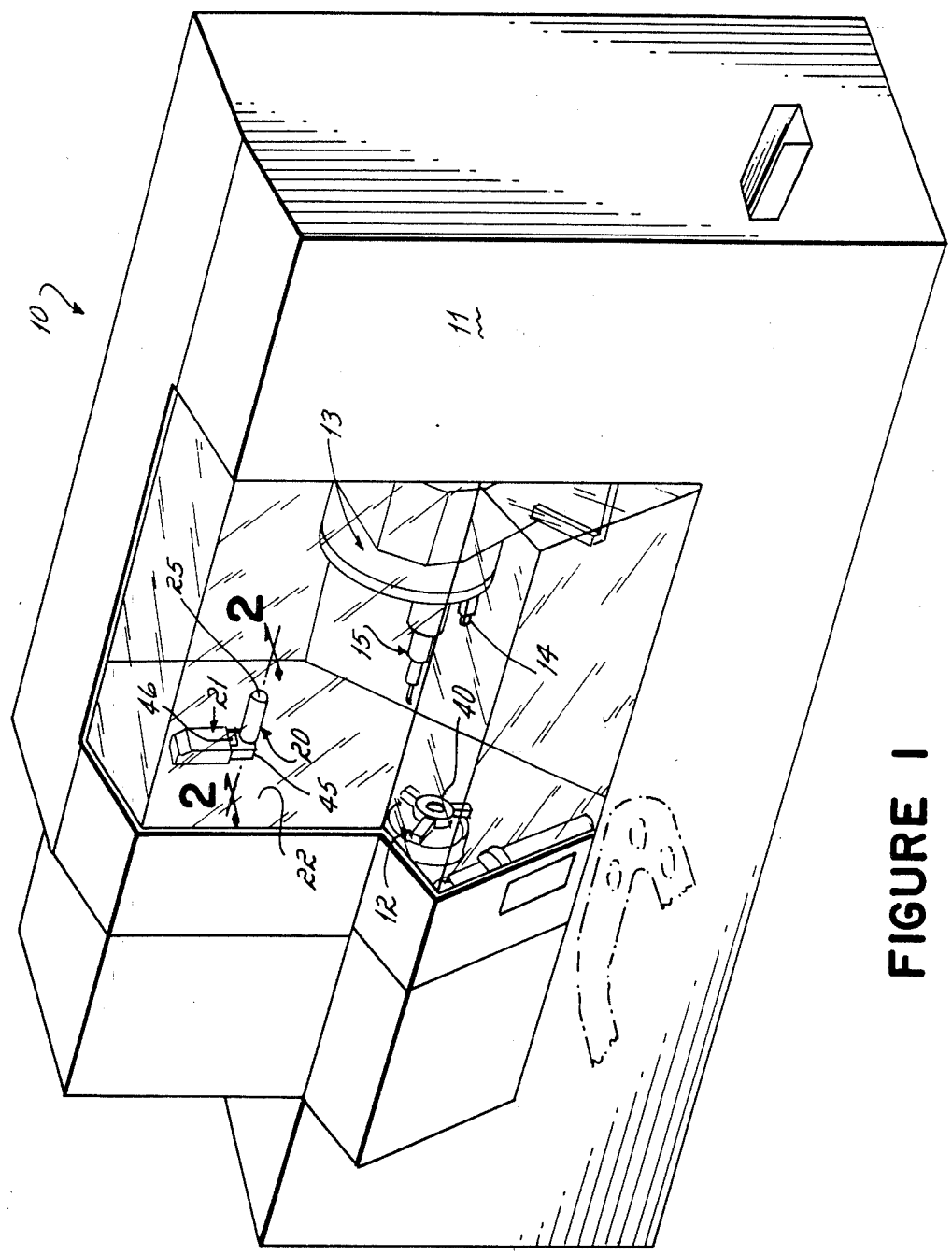
FIG. 1 is a diagrammatic perspective view of a lathe of the type to which the invention is directed.

Referring to FIG. 1, a lathe is shown at 10, the lathe including a housing 11 which contains a rotating chuck 12, a mechanism for rotating it and a turret 13. The turret 13 has a plurality of stations on which the desired tools 14 required for the cutting operations are mounted. A probe 15 is mounted on the turret at one of the tool stations. Conventional mechanism, not shown, is provided for rotating the turret to bring the proper tool or probe into position with respect to a workpiece secured within the chuck. Additional conventional mechanism, not shown, is provided for moving the turret along three axes so as to position the turret properly with respect to the workpiece.

Figure 2:
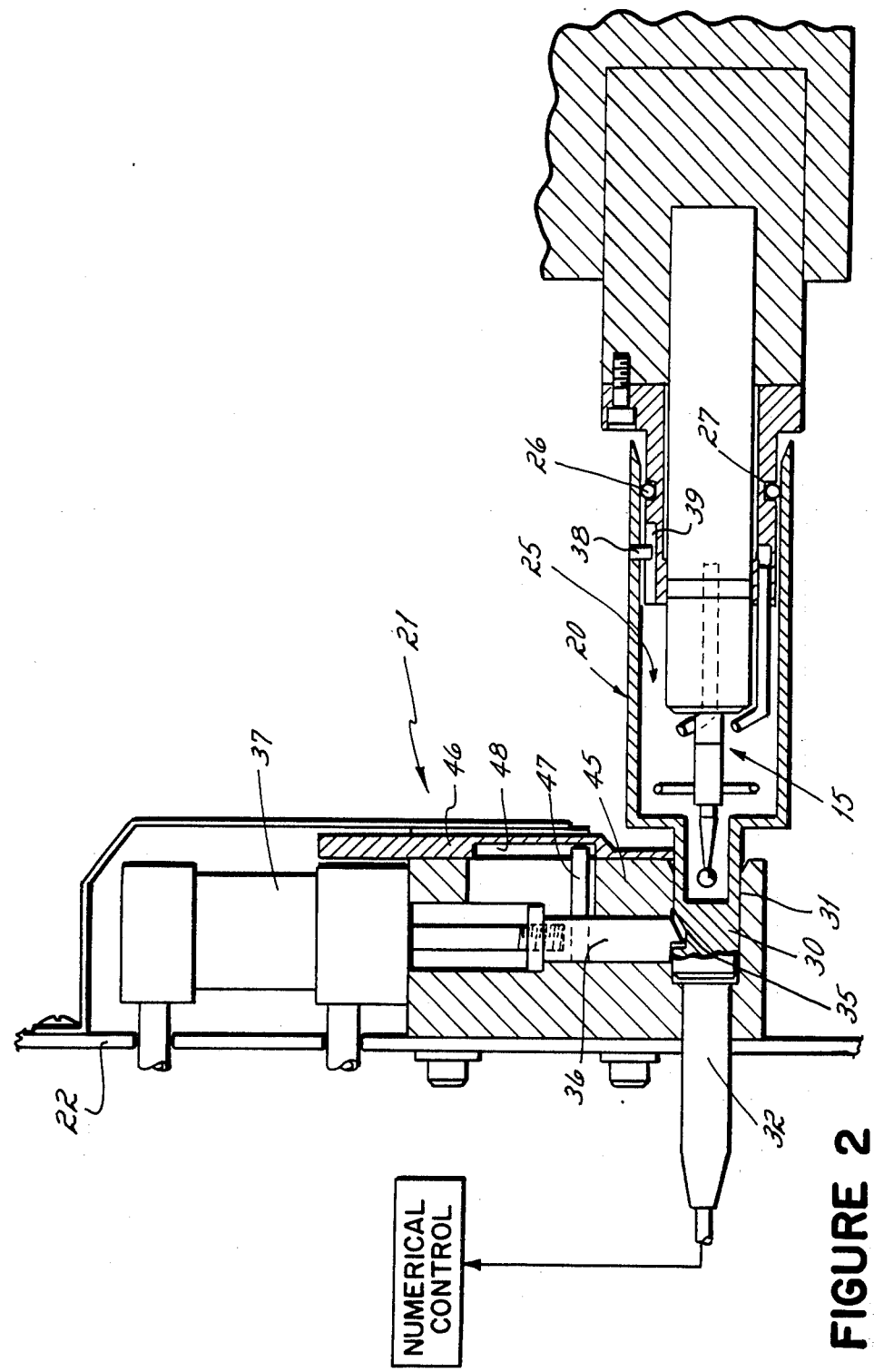
FIG. 2 is a cross-sectional view taken along lines 2—2 of FIG. 1 showing the probe, its cover and the manner in which the cover is mounted.

A probe cover 20 is mounted in a gripper 21 secured to an inside surface 22 of the housing 11. The gripper 21 is positioned adjacent the chuck and opposite the turret. As shown in FIG. 2, the probe cover 20 is a hollow receptacle presenting a chamber 25 within which the probe 15 may be inserted. The probe has an O-ring 26 placed in an annular groove 27 in its surface. The O-ring 26 performs the dual functions of providing a friction grip between the probe 15 and the cover 20 as well as providing a barrier which restricts the introduction of contaminants into the chamber 25. Because the probe and O-ring become uncovered only during a quiescent period when the cutting operations and supply of lubricant have been stopped, the O-ring probe and interior of the cover 20 remain reasonably free of contamination.

The cover has a retention stem 30 which is insertable into a recess 31 in the gripper housing 21. A proximity switch 32 is placed in the recess to detect the presence or absence of a probe cover within the recess. The signal from the proximity switch 32 is fed to the numeric control for the lathe and provides a part of the information required for the operation of the lathe.

The stem 30 has a depression 35 in its surface. A latch 36 operated by a double-acting piston and cylinder 37 is engageable with the depression 35 to retain the cover when in extended position and to release the cover when in retracted position. The latch is operated by the numeric control system. The cover has a key 38, and the probe has a keyway 39, the key and keyway cooperating to maintain the angular position of the cover which presents the depression at an upper location suitable for engagement with the latch 36.

The latch 36 is slidable in a block 45. A sliding cover 46 is mounted on the block 45 for vertical sliding movement. A roll pin 47 is fixed to the latch 36 and extends through a vertical slot in the block 45. The slide cover 46 has a vertical slot 48 into which the pin 47 is received. The slot provides a lost motion connection between the sliding cover 46 and the pin 47.

The function of the sliding cover is to cover the recess 31 when the probe cover 20 has been removed. To accomplish this, the latch 36 is raised to permit the probe cover to be removed. When the latch is raised to its fully retracted position, the pin 47 will ride in the slot 48 until it engages the latch cover and thus will lift the latch cover to a position permitting the probe cover to be removed. When the probe cover is removed, the latch is lowered to its fully-extended position shown in FIG. 2, thereby permitting the sliding cover 46 to drop down across the recess 31 and cover the recess. In this position, the sliding cover blocks the entry of contaminants to the recess 31. When the probe cover is to be returned, the latch is again raised to its fully-retracted position, thereby raising the sliding cover 46 so as to open the recess 31 for introduction of the probe cover.

Figure 5:
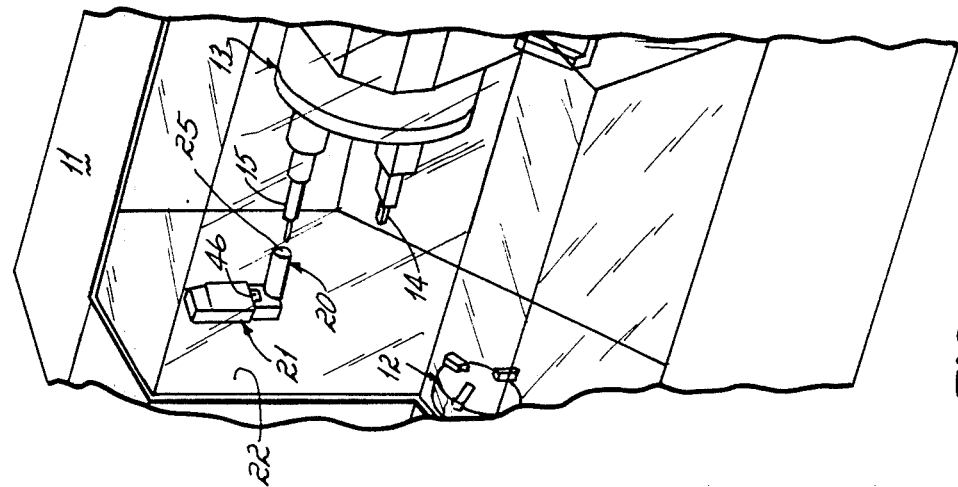
FIGS. 3, 4 and 5 are diagrammatic perspective views showing the sequence of operations for applying the cover to the probe.
Figure 4:
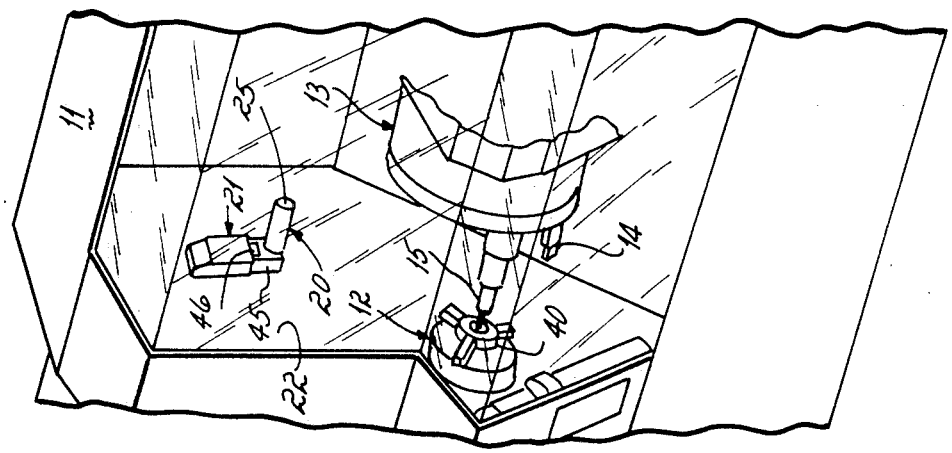
Figure 3:
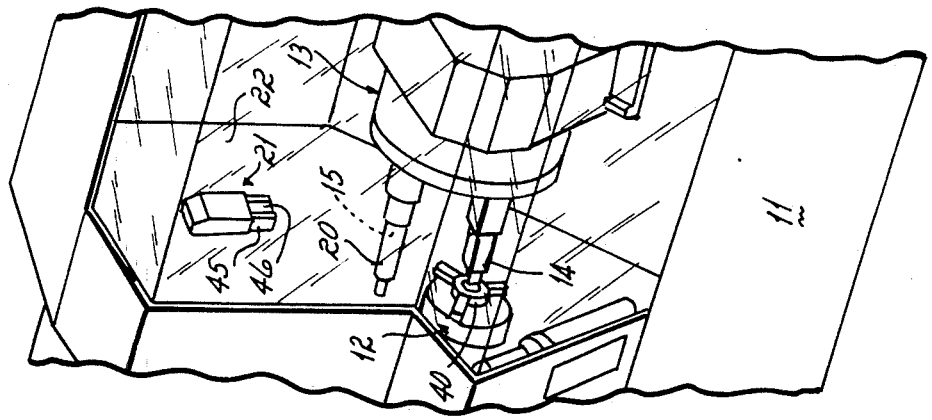

The operation of the lathe with respect to the use of the probe cover is depicted in FIGS. 3, 4 and 5. In FIG. 3, the cover 20 is applied to the probe and a tool 14 is in engagement with a workpiece 40 held in the chuck 12. While not shown, it is to be understood that removed metal will be in the housing and a stream of coolant will be splashing all over the workpiece 40, the tool 14 and the probe cover 20. In FIG. 4, lubricant has been shut down and the machining of the workpiece 40 has ceased. The probe cover 20 has been removed and resides in the gripper 21. In this quiescent condition, the probe 15 is inserted into the workpiece 40 to gage the part.

After the gaging operation, the turret is moved to the position depicted in FIG. 5 wherein the probe 15 is in alignment with the cover 20. The turret will thereafter be moved longitudinally to insert the probe into the cover as depicted in FIG. 2. During this period, a new part can be manually or automatically inserted into the chuck 12 for another machining operation. The cycle time between machine parts may be, for example, 1½ minutes. The time required to place the probe cover over the probe is approximately a 5 second operation. Thus, very little in the way of increased cycle time is imposed on the operation through the use of the probe cover. The probe cover, on the other hand, saves substantially in extending the life of the probe and in minimizing the down time and labor required for recalibration when a new probe is inserted.

Having described my invention, I claim:

1. In a lathe having a housing, a chuck for holding a workpiece, said chuck being mounted at one side of said housing, a tool-holding turret opposite said chuck, said turret having a plurality of tool-holding positions, and a probe mounted in one of those positions, means for rotating said turret to bring the proper tool into position and means for moving said turret longitudinally and transversely to bring tools into engagement with said workpiece, the improvement comprising:

a probe cover separable from the probe and covering the probe when said probe is not in use, and means for removing said cover from said probe automatically and retaining said probe cover on said one side of said lathe housing when said probe is to be used.

2. A lathe as in claim 1 further comprising:

gripping means between said cover and said probe to maintain said cover securely on said probe when said probe is not in use.

3. A lathe as in claim 2 in which said gripping means is an O-ring mounted on said probe.

4. A lathe as in claim 3 further comprising:

said probe cover having a retention stem and a depression in said stem, a gripper unit for removing said probe cover from said probe, said gripper unit consisting of a gripper housing with a recess in said housing to receive said probe cover retention stem, a latch mounted in said housing and extending into said recess to engage said depression in said probe cover retention stem, and a key and keyway between said probe and probe cover to maintain said probe in a proper position when entering said recess for engagement of said latch with said depression.

5. A lathe as in claim 4 further comprising:

a proximity switch adjacent said recess to determine when said probe cover has been returned to its desired position within said housing.

6. A lathe as in claim 4 further comprising:

a sliding cover covering the recess in said housing when said latch is in the down position.

* * * * *